(No Model.) 2 Sheets—Sheet 2.
J. M. KELLY.
STRETCHING AND SUPPORTING DEVICE FOR WIRE FENCES.
No. 361,223. Patented Apr. 12, 1887.
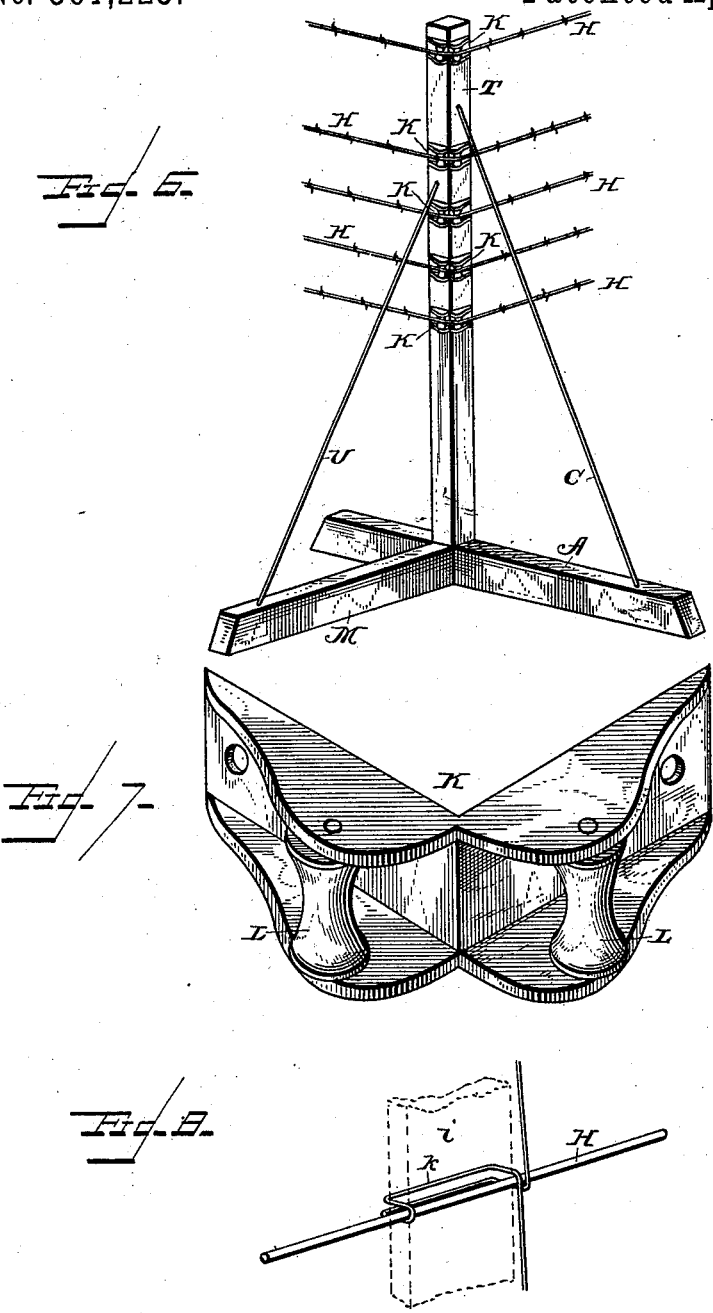
WITNESSES
INVENTOR
J. M. Kelly
by Anderson & Smith
ATTORNEYS

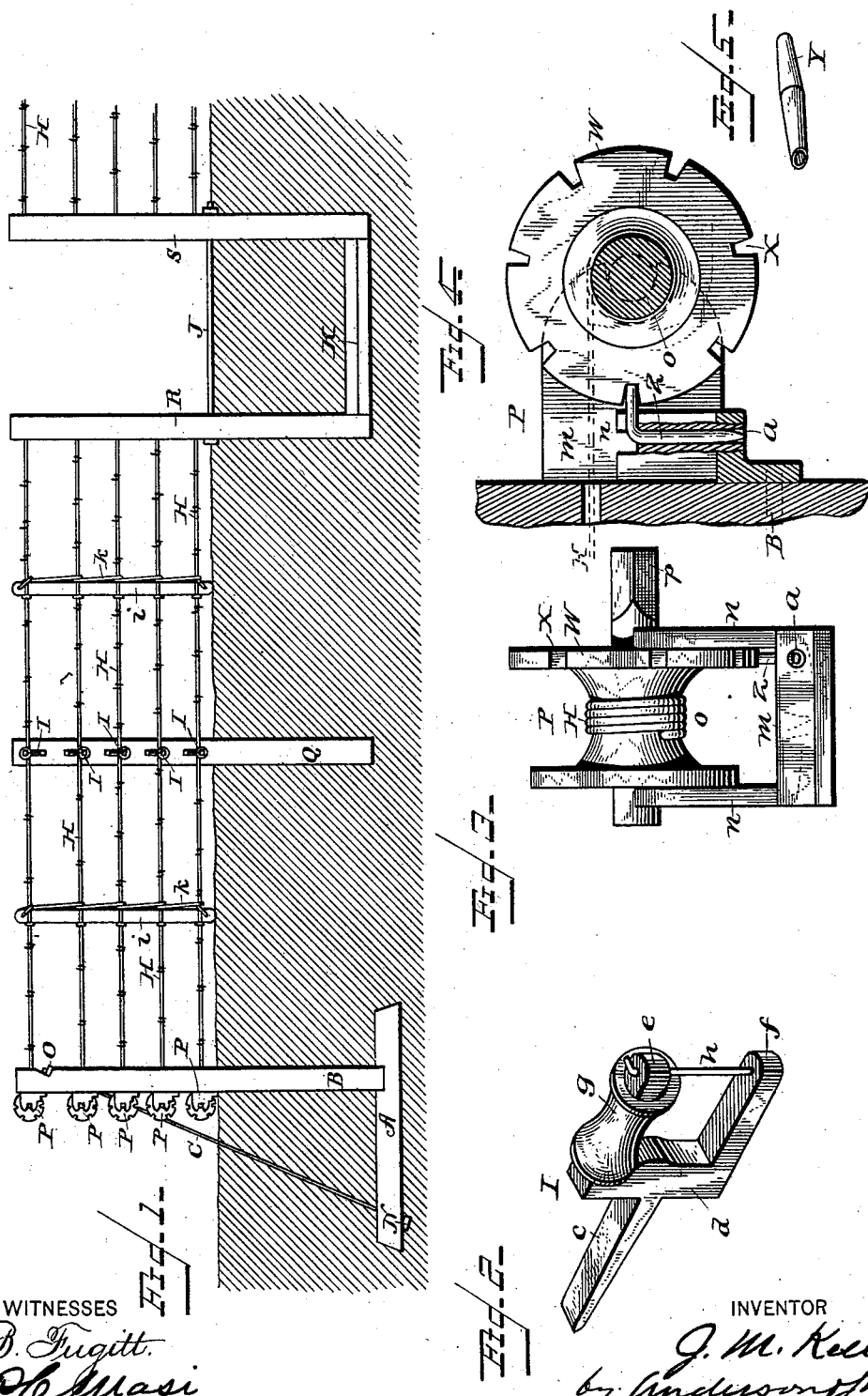

UNITED STATES PATENT OFFICE.

JAMES MADISON KELLY, OF KINGSTON, INDIANA, ASSIGNOR OF ONE-HALF TO HENRY HOLLENSBE, OF SAME PLACE.

STRETCHING AND SUPPORTING DEVICE FOR WIRE FENCES.

SPECIFICATION forming part of Letters Patent No. 361,223, dated April 12, 1887.

Application filed November 1, 1886. Serial No. 217,711. (No model.)

*To all whom it may concern:*

Be it known that I, JAMES MADISON KELLY, a citizen of the United States, and a resident of Kingston, in the county of Decatur and State of Indiana, have invented certain new and useful Improvements in Stretching and Supporting Devices for Wire Fences; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is an elevation of a section of my improved fence. Fig. 2 is a detail perspective view of one of the castings supporting the wires. Fig. 3 is a view of one of the stretchers. Fig. 4 is a sectional view of the same. Fig. 5 is a perspective view of the key. Fig. 6 is a perspective view of the corner-post. Fig. 7 is a perspective view of one of the flanged castings. Fig. 8 is a detail perspective view showing the manner of connecting the fence-wire to the stay-bars.

My invention relates to fences; and it consists in the construction and novel combination of parts, as hereinafter described and claimed.

Referring by letter to the accompanying drawings, A designates the ground-sills of the fence. The ground-sills are preferably about six feet long and are embedded in the ground in a horizontal position about four feet below the surface. The ground-sills are notched transversely in their upper faces to receive the lower ends of the brace-posts B.

C designates brace-rods or metallic tie-rods, which pass through the ground-sills near one end thereof, and are secured by nuts N. The tie-rods C also pass through the brace-posts near the upper ends of the latter, and are secured at their upper ends by nuts O.

Q designates the fence-posts, which are set in the ground in the usual manner, but are also set to about the same depth as the brace-posts are.

R and S designate the gate-posts, which are of the same length as the brace-posts, and are set in the ground about the same depth, but do not rest on sills. Between the gate-posts, however, are placed anchor-blocks K, which prevent the lower ends of said gate-posts from approaching each other when the strain of the wires comes upon them. A tie-wire, J, connects the gate-posts R and S at the surface of the ground and receives the lateral strain that comes upon said gate-posts above the ground.

T designates a corner-post, which is also a brace-post and rests upon a sill, A, embedded in the ground. The post T is braced by two brace-rods, C U, one of which is connected to the sill A of said corner-post and the other to a sill, M, which may be either parallel therewith or at right angles to the sill of said corner-post.

H designates the fence-wires, which are preferably barbed. The wires H are connected at one end to the gate-posts, (where a gate is employed,) and castings I secure the wires to the fence-posts Q, which are located between the brace-posts and gate-posts, or between the brace-posts and corner-posts, as the case may be. Where the wires pass around the corner of the corner-posts, I employ a flanged casting, K, which fits the angle of the post, and is secured to the post by nails.

The flanged casting K is provided with rollers L L between its flanges, to prevent the wires from making angular bends at the corner-posts, which angular bends, if they occurred, would interfere with the stretching of the wires over the corner-posts, as I do not break the wires at the corner-posts, as is now commonly done, but continue them along said posts.

At the brace-posts B, I provide a stretcher, P, for each fence-wire H. The stretcher consists of a flanged casting, *m*, between the flanges *n* of which is journaled a flanged winding-drum, *o*, one end of the shaft *p* of which is made rectangular in cross-section to receive a crank, by which the drum is operated to stretch or tighten the wire, or to relax the wire should the latter become too taut in cold weather.

The larger annular flange, W, of the winding-drum is provided with radial notches X, into which the toe of a pivot-detent, Z, takes to hold the drum to its place. The pivot-detent Z is operated by a key, Y, which fits the stem of the pivot-detent Z, which latter is journaled in a key hole or seat, *a*, in the base of the casting *m*.

Y designates the key by which the detent Z is turned to engage the drum o and to disengage therefrom when necessary.

I is a casting having a tapered tang, c, projecting from the rear edge of its vertical portion d, the portion d being provided at its ends with integral arms e f, having eyes at their ends. A flanged spool, g, which serves as a wire-carrier, is slipped upon either the upper or lower arm of the casting I, as may be necessary to engage the fence-wire, and serves as a carrier for the wire to reduce the friction that results when tightening the wires. In some instances the fence-wire would bear against the upper arm of the casting. The carrier or friction sleeve or spool g should then be placed on the upper arm of the casting. In other cases the wire will bear downwardly, and in that case the spool or friction-sleeve should be placed on the lower arm of the casting. The sleeve g is prevented from slipping from place by a rod, h, secured in eyes of the casting. To place the sleeve in the proper position it is only necessary to hold the casting in the desired position at the time of driving it into the fence-post.

To prevent the fence-wires from sagging between the posts, and to hold them the proper distances apart, I employ stay-bars i, which I connect to the fence-wire by wire stays k, which I secure in a hole in the upper end of each stay-bar, and then carry said wire k around each fence-wire at each edge of the stay-bar until each fence-wire has been embraced by the stay-wire k, and finally secure the stay-wire to the wooden stay-bar near the lower end of the latter. In this way the stay-bar will always be held in a vertical position, and the fence-wires will be effectually stayed without interfering with their action when tightened or loosened when operating the stretchers.

I am aware that staples and carrying-rollers have been used in connection with tightening devices in this class of fences, and, also, that the corner-posts of said fences have been provided with grooved rollers supported in vertical positions by brackets, and that the fence-wires have been stretched over said rollers. I do not, therefore, claim said constructions herein.

Having described this invention, what I claim, and desire to secure by Letters Patent, is—

1. In a fence, the combination, with the posts and wires, as described, of the stretchers secured to the posts and composed of a winding-drum having a radially-notched flange, a socket bearing a key-seat, and an angular key or detent adapted to engage the notches of the said flange, substantially as specified.

2. The casting having a tapering tang to enter a post, and two parallel arms perforated at their outer ends, in combination with a friction-spool and the locking-pin adapted to enter the perforations of the arms, substantially as specified.

In testimony whereof I affix my signature in presence of two witnesses.

JAMES MADISON KELLY.

Witnesses:
CHARLES H. PORTER,
CHAS. ZOLLER, Jr.